US012487968B2

(12) United States Patent
Shanmugam et al.

(10) Patent No.: US 12,487,968 B2
(45) Date of Patent: Dec. 2, 2025

(54) AUTOMATIC NAMESPACE DELETION SYSTEM

(71) Applicant: Dell Products L.P., Round Rock, TX (US)

(72) Inventors: Murali Manohar Shanmugam, Leander, TX (US); Kevin Jiajun Wu, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 133 days.

(21) Appl. No.: 18/489,552

(22) Filed: Oct. 18, 2023

(65) Prior Publication Data

US 2025/0130975 A1 Apr. 24, 2025

(51) Int. Cl.
*G06F 16/16* (2019.01)
*G06N 20/00* (2019.01)
(52) U.S. Cl.
CPC .......... *G06F 16/162* (2019.01); *G06N 20/00* (2019.01)
(58) Field of Classification Search
CPC .................................................. G06F 16/162
See application file for complete search history.

(56) References Cited

U.S. PATENT DOCUMENTS

| 8,954,703 | B2 | 2/2015 | Koren et al. | |
| 2017/0255415 | A1* | 9/2017 | Bubeyko | G06F 11/0772 |
| 2021/0157761 | A1* | 5/2021 | Bolen | G06F 3/0658 |
| 2022/0215101 | A1* | 7/2022 | Rioux | G06F 21/577 |
| 2024/0275592 | A1* | 8/2024 | Kavirayani | H04L 9/0894 |

* cited by examiner

*Primary Examiner* — Van H Oberly
(74) *Attorney, Agent, or Firm* — Joseph Mencher

(57) ABSTRACT

An automatic namespace deletion system includes an automatic namespace deletion subsystem that is coupled to a storage system. The automatic namespace deletion subsystem receives a namespace creation instruction and, in response, creates a namespace in the storage system and sets a namespace deletion flag for the namespace. The automatic namespace deletion subsystem then stores data in the namespace in the storage system. Subsequent to storing the data in the namespace of the storage system, the automatic namespace deletion subsystem performs an initialization process and, during the initialization process, identifies the namespace deletion flag and, in response, deletes the namespace from the storage system.

20 Claims, 17 Drawing Sheets

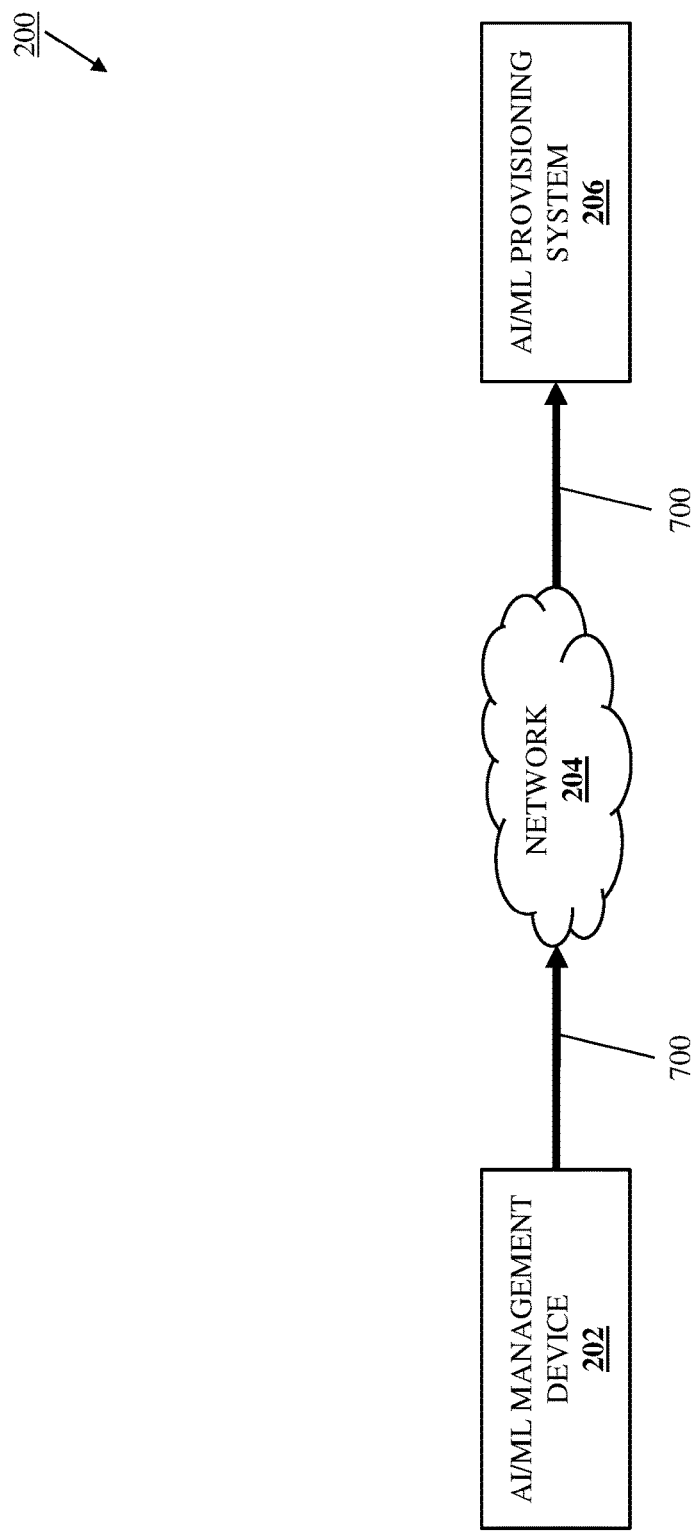

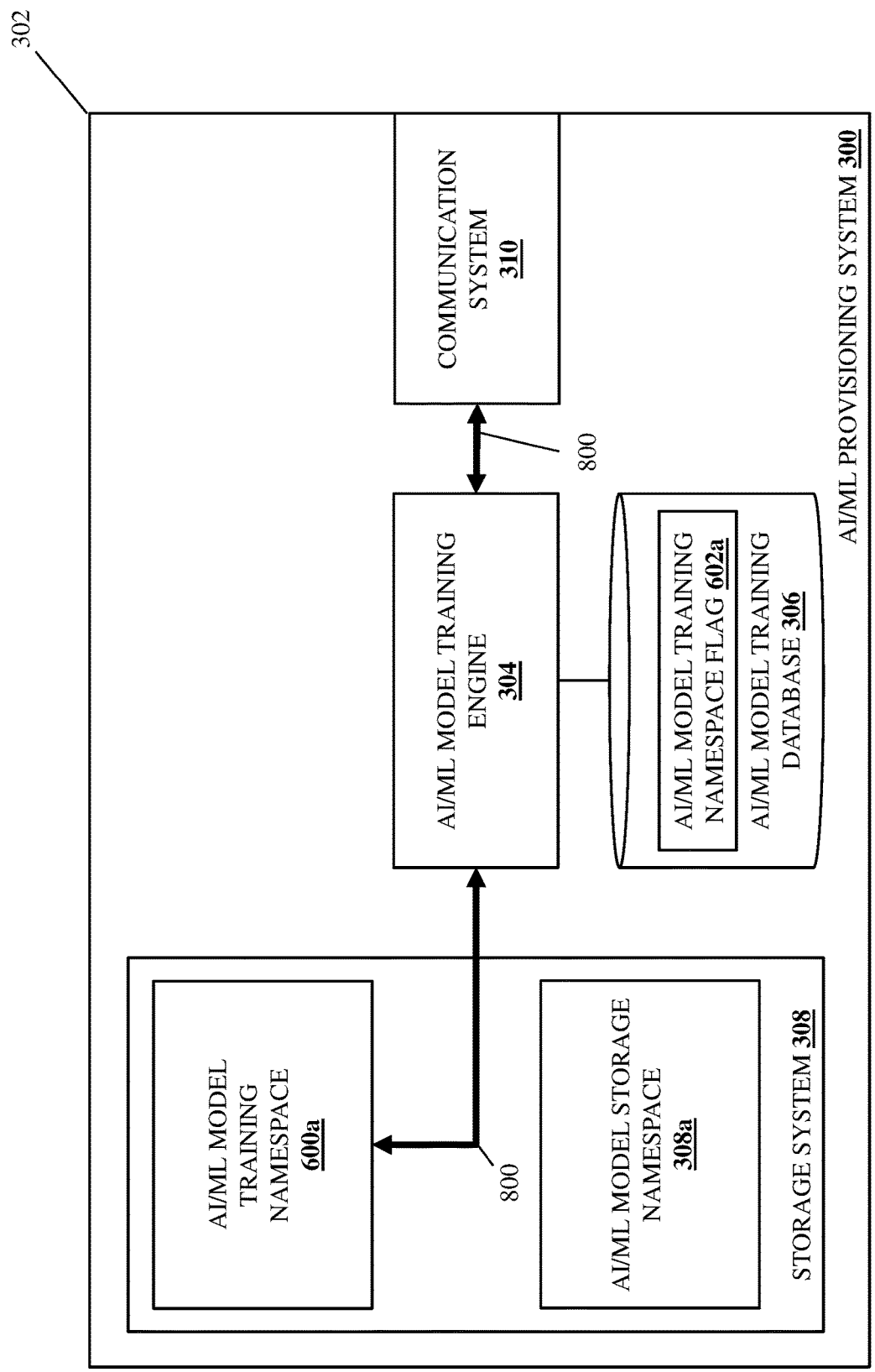

AUTOMATIC NAMESPACE DELETION SYSTEM

BACKGROUND

The present disclosure relates generally to information handling systems, and more particularly to automatically deleting namespaces used by information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handlings systems such as, for example, server devices and/or other computing devices known in the art, sometimes utilize relatively high-security data, and the storage and other handling of such relatively high-security data can raise issues. For example, server devices are sometimes used to train Artificial Intelligence/Machine Learning (AI/ML) models using AI/ML model training data that often includes a variety of proprietary, sensitive, and/or other high-security data, and the AI/ML model training process requires storage of such AI/ML model training data in a manner that can present a single point-of-failure attack vector.

To provide a specific example, the costs of such AI/ML model training tends to be relatively high due to the need for relatively expensive Central Processing Units (CPUs), Graphics Processing Units (GPUs), and corresponding memory needed to perform the AI/ML model training operations, and thus users may turn to network-based or cloud-based AI/ML-model-training-as-a-Service (aaS) systems that allow the temporary use of such AI/ML-model-training-aaS systems by a variety of different users. While the CPUs, GPUs, and corresponding memory of such AI/ML-model-training-aaS systems utilize volatile storage subsystems that do not persistently store any AI/ML model training data used to train AI/ML models, the AI/ML model training data must be stored in non-volatile/persistent storage for use in training AI/ML modules, and block storage media such as Non-Volatile Memory express (NVMe) Solid State Drive (SSD) storage devices are often used for such purposes due to the relatively high Input/Output (I/O) performance requirements associated with AI/ML model training.

As will be appreciated by one of skill in the art in possession of the present disclosure, following AI/ML model training, the resulting AI/ML model may be stored and used independently of the AI/ML model training data, and conventional AI/ML-model-training-aaS systems require the user to manually delete of the AI/ML model training data from the non-volatile/persistent storage. However, the requirement of manual deletion of AI/ML model training data from non-volatile/persistent storage in AI/ML-model-training-aaS systems is error prone (e.g., as users can forget to do so, or may not delete all of the AI/ML model training data), and even when performed correctly such AI/ML model training data may be subject to recovery and/or reconstruction following its manual deletion.

Accordingly, it would be desirable to provide an AI/ML model training data security system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide an automatic namespace deletion engine that is configured to: receive a namespace creation instruction; create, in response to receiving the namespace creation instruction, a namespace in a storage system that is coupled to the processing system; set a namespace deletion flag for the namespace; store data in the namespace in the storage system; perform, subsequent to storing the data in the namespace of the storage system, an initialization process; identify, during the initialization process, the namespace deletion flag; and delete, in response to identifying the namespace deletion flag, the namespace from the storage system.

BRIEF DESCRIPTION OF THE DRAWINGS

FIG. 7A is a schematic view illustrating an embodiment of the networked system of FIG. 2 operating during the method of FIG. 4.

FIG. 8B is a schematic view illustrating an embodiment of the AI/ML provisioning system of FIG. 3 operating during the method of FIG. 4.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
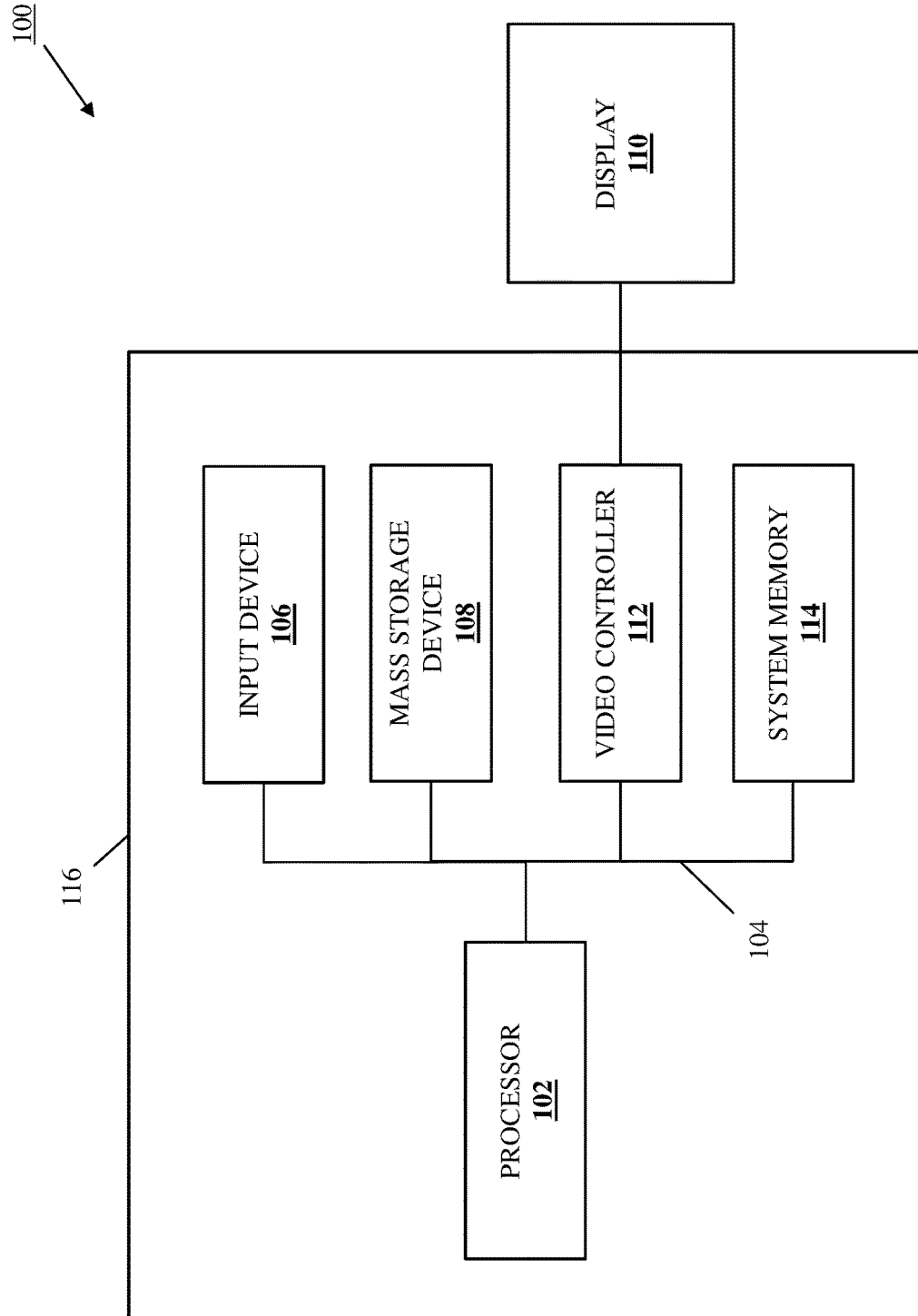
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
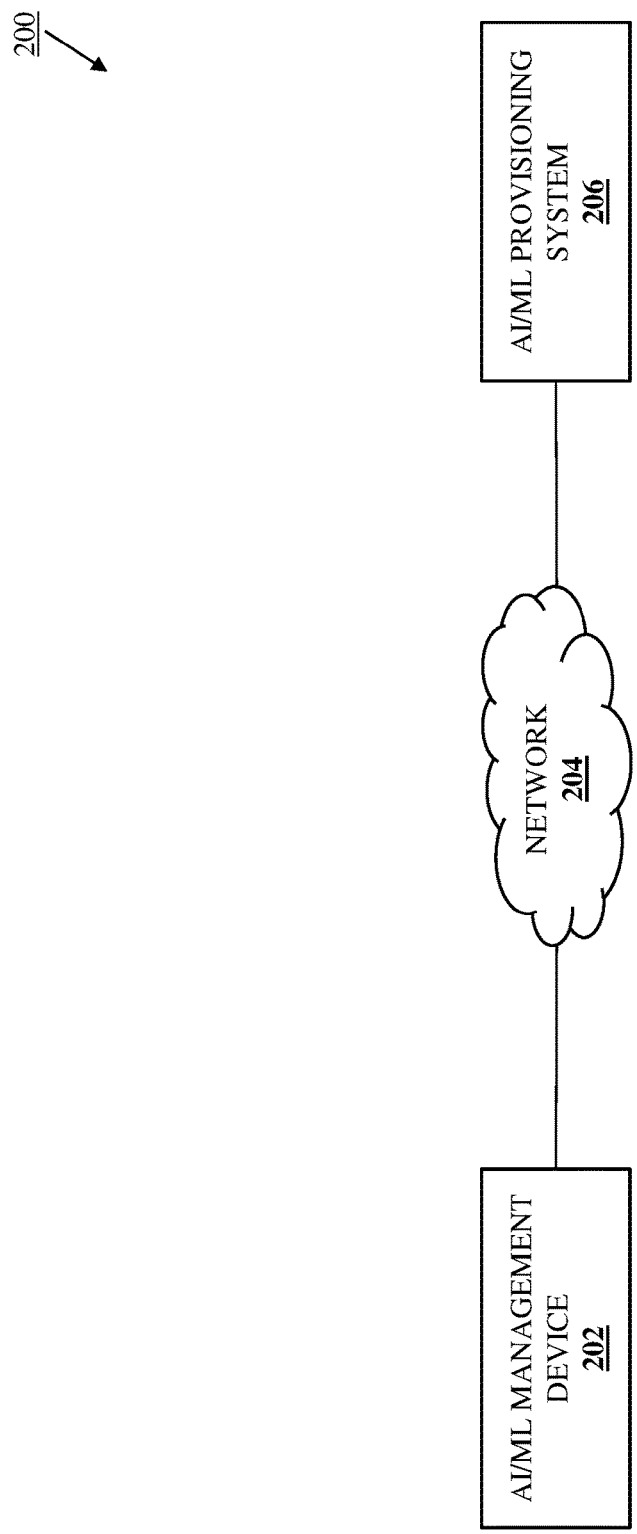
FIG. 2 is a schematic view illustrating an embodiment of a networked system that may be used with the automatic namespace deletion system of the present disclosure.

Referring now to FIG. 2, an embodiment of a networked system 200 is illustrated that may be used with the automatic namespace deletion system of the present disclosure. In the illustrated embodiment, the networked system 200 includes an Artificial Intelligence/Machine Learning (AI/ML) management device 202. In an embodiment, the AI/ML management device may be provided by the IHS 100 discussed above with reference to FIG. 1, and/or may include some or all of the components of the IHS 100, and in specific examples may be provided by a desktop computing device, a laptop/notebook computing device, a tablet computing device, a mobile phone, and/or other computing devices that would be apparent to one of skill in the art in possession of the present disclosure. However, while illustrated and discussed as being provided by particular computing devices, one of skill in the art in possession of the present disclosure will recognize that the AI/ML management device 202 provided in the networked system 200 may include any computing devices that may be configured to operate similarly as the AI/ML management device 202 discussed below.

In the illustrated embodiment, the AI/ML management device 202 is coupled to a network 204 that may be provided by a Local Area Network (LAN), the Internet, combinations thereof, and/or any other networks that would be apparent to one of skill in the art in possession of the present disclosure. Furthermore, an AI/ML provisioning system 206 is coupled to the AI/ML management device 202 via the network 206. In an embodiment, the AI/ML provisioning system 206 may be provided by the IHS 100 discussed above with reference to FIG. 1, and/or may include some or all of the components of the IHS 100, and in specific examples may be provided by one or more server devices. However, while illustrated and discussed as being provided by server device(s), one of skill in the art in possession of the present disclosure will recognize that the AI/ML provisioning system 206 provided in the networked system 200 may include any computing devices that may be configured to operate similarly as the AI/ML provisioning system 206 discussed below.

To provide a specific example, the AI/ML provisioning system 206 may be an AI/ML-model-training-aaS system that is configured to provide for the training of AI/ML models as-a-Service via the network 204 to AI/ML management devices like the AI/ML management device 202 described below. As such, the AI/ML provisioning system 206 may be provided by a single server device that includes the processing resources (e.g., CPU resources and GPU resources), memory resources, and storage resources needed to perform the AI/ML model training described below, and may implement the automatic namespace deletion system of the present disclosure as part of that model training in order to prevent access to the AI/ML model training data used in the AI/ML model training. However, one of skill in the art in possession of the present disclosure will appreciate how the AI/ML provisioning system 206 may be provided by a plurality of server devices (e.g., distributed "cloud" AI/ML provisioning resources that may include processing resources, memory resources, and storage resources distributed across multiple server devices) while remaining within the scope of the present disclosure as well. Furthermore, one of skill in the art in possession of the present disclosure will recognize that other embodiments of the present disclosure may be integrate the AI/ML management device 202 with the AI/ML provisioning system 206 to provide an integrated AI/ML provisioning and management system (i.e., rather than the AI/ML-model-training-aaS system described above) while remaining within the scope of the present disclosure as well.

Further still, while described herein as being implemented by an AI/ML provisioning system, one of skill in the art in possession of the present disclosure will appreciate how the automatic namespace deletion system of the present disclosure may be implemented in a variety of other scenarios where relatively high-security data is utilized and then has access to it subsequently prevented similarly as described below. As such, while a specific networked system 200 has been illustrated and described, one of skill in the art in possession of the present disclosure will recognize that the automatic namespace deletion system of the present disclosure may include a variety of components and component configurations while remaining within the scope of the present disclosure as well.

Figure 3:
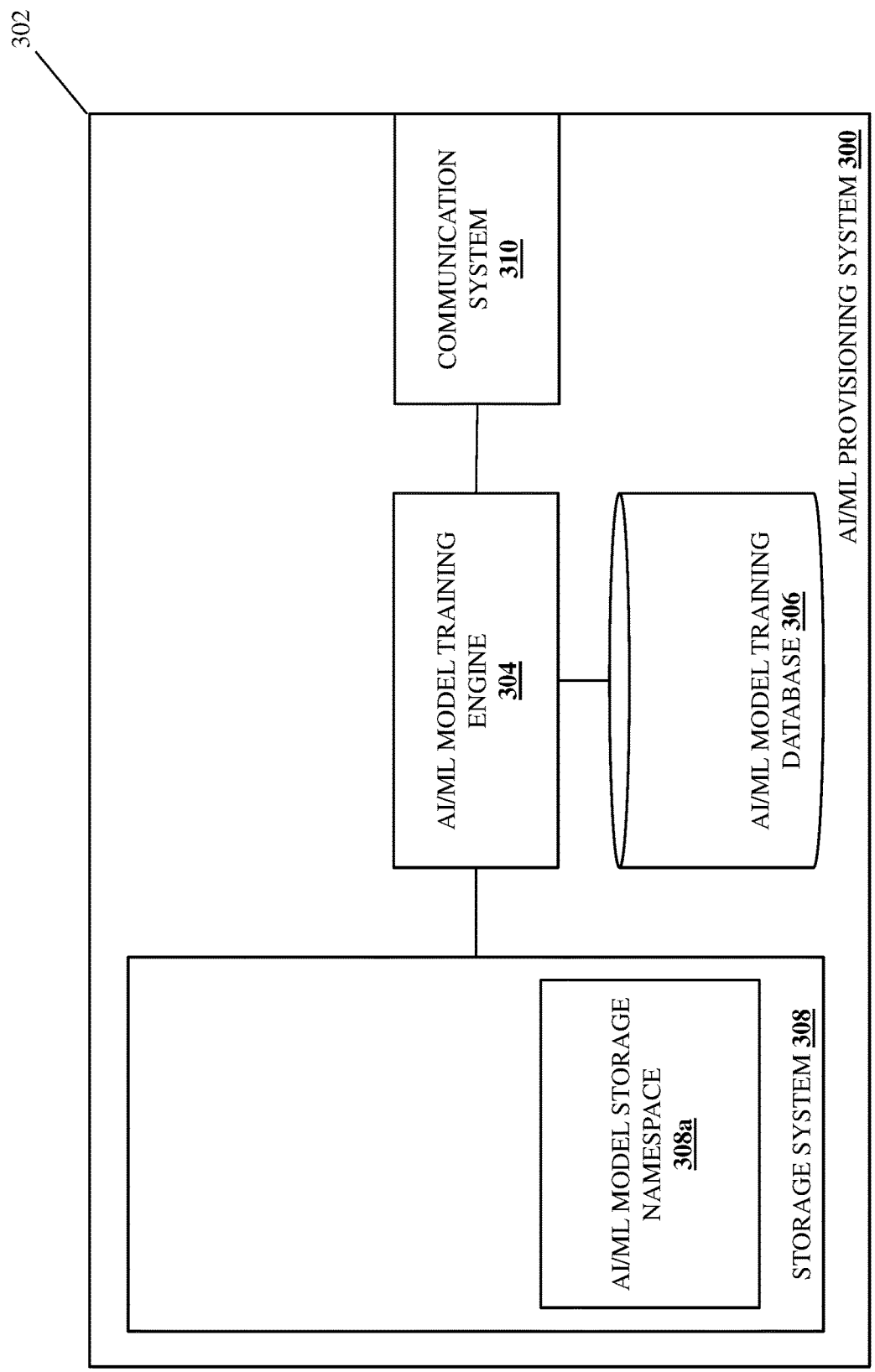
FIG. 3 is a schematic view illustrating an embodiment of an AI/ML provisioning system that may include the automatic namespace deletion system of the present disclosure.

Referring now to FIG. 3, an embodiment of an AI/ML provisioning system 300 is illustrated that may provide the AI/ML provisioning system 206 discussed above with reference to FIG. 2. As such, the AI/ML provisioning system 300 may be provided by the IHS 100 discussed above with reference to FIG. 1 and/or may include some or all of the components of the IHS 100, and in specific examples may be provided by one or more server devices. Furthermore, while illustrated and discussed as being provided by server device(s), one of skill in the art in possession of the present disclosure will recognize that the functionality of the AI/ML provisioning system 300 discussed below may be provided by other devices that are configured to operate similarly as the AI/ML provisioning system 300 discussed below.

In the illustrated embodiment, the AI/ML provisioning system 300 includes a chassis 302 that houses the components of the AI/ML provisioning system 300, only some of which are illustrated and described below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide an AI/ML module training engine 304 that is configured to perform the functionality of the AI/ML model training engines and/or AI/ML provisioning systems discussed below.

To provide a specific example, the processing system and the memory system that provide the AI/ML model training engine 304 may include a Basic Input/Output System (BIOS) processing subsystem (not illustrated, but which may be provided by any of a variety of BIOS firmware processing resources that would be apparent to one of skill in the art in possession of the present disclosure) and a BIOS memory subsystem (not illustrated, but which may be provided by any of a variety of BIOS firmware memory resources that would be apparent to one of skill in the art in possession of the present disclosure) that includes instructions that, when executed by the BIOS processing subsystem, cause the BIOS processing subsystem to provide a BIOS that is configured to perform at least some (and in some cases all) of the AI/ML model training functionality described below for the AI/ML model training engine 304. Furthermore, while described as a BIOS, one of skill in the art in possession of the present disclosure will appreciate how the BIOS discussed below may be replaced by a Unified Extensible Firmware Interface (UEFI) while remaining within the scope of the present disclosure as well.

To provide another specific example, the processing system and the memory system that provide the AI/ML model training engine 304 may include a Baseboard Management Controller (BMC) processing subsystem (not illustrated, but which may be similar to the processor 102 discussed above with reference to FIG. 1) and a BMC memory subsystem (not illustrated, but which may be similar to the memory 114 discussed above with reference to FIG. 1) that includes instructions that, when executed by the BMC processing subsystem, cause the BMC processing subsystem to provide a BMC that is configured to perform at least some of the AI/ML model training functionality described below for the AI/ML model training engine 304. To provide a specific example, the BMC discussed above may be provided by an integrated DELL® Remote Access Controller (iDRAC) provided in server devices available from DELL® Inc. of Round Rock, Texas, United States, and thus may provide an Out-Of-Band (OOB) management platform for server device(s) that utilizes separate resources from the server device(s) to provide a browser-based or Command-Line-Interface (CLI)-based user interface for managing and monitoring server device resources. However, while the AI/ML model training engine 304 is described herein as being provided by an BIOS or BMC, one of skill in the art in possession of the present disclosure will appreciate how at least some of the functionality of the AI/ML model training engine 304 described below may be provide by other subsystems (e.g., CPUs, GPUs, an operating system or other application, etc.) while remaining within the scope of the present disclosure as well.

The chassis 302 may also house a database system (not illustrated, but which may include processor-accessible storage and/or memory devices that would be apparent to one of skill in the art in possession of the present disclosure) that is coupled to the AI/ML model training engine 304 (e.g., via a coupling between the database system and the processing system) and that includes an AI/ML model training database 306 that is configured to store any of the information utilized by the AI/ML model training engine 304 discussed below. The chassis 302 may also house a storage system 308 that is coupled to the AI/ML model training engine 304 (e.g., via a coupling between the storage system and the processing system) and that, in the embodiments described below, is provided by one or more Non-Volatile Memory express (NVMe) Solid State Drive (SSD) storage devices, but that one of skill in the art in possession of the present disclosure will appreciate may be provide by other storage devices while remaining within the scope of the present disclosure as well.

In the embodiments illustrated and described below, the storage system 308 has been configured with an AI/ML model storage namespace that one of skill in the art in possession of the present disclosure will appreciate may be provided for the storage of the AI/ML models that are trained by the AI/ML model training engine 304 as described below. However, as also described below, the AI/ML models that are trained by the AI/ML model training engine 304 as described below may be provided to the AI/ML management device 202 discussed above with reference to FIG. 2 and/or otherwise stored outside the AI/ML provisioning system 206/300, and thus in some embodiments the storage system 308 need not be configured with the AI/ML model storage namespace 308a as illustrated. The chassis 302 may also house a communication system 308 that is coupled to the AI/ML model training engine 304 (e.g., via a coupling between the communication system 308 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure.

Similarly as discussed above, while described herein as being implemented by an AI/ML provisioning system, one of skill in the art in possession of the present disclosure will appreciate how the automatic namespace deletion system of the present disclosure may be implemented in a variety of other scenarios where relatively high-security data is utilized and then has access to it subsequently prevented similarly as described below. As such, while a specific automatic namespace deletion system has been illustrated and described, one of skill in the art in possession of the present disclosure will recognize that automatic namespace deletion systems (or other devices operating according to the teachings of the present disclosure in a manner similar to that described below for the AI/ML provisioning system 300) may include a variety of components and/or component configurations for providing conventional functionality, as well as the automatic namespace deletion functionality discussed below, while remaining within the scope of the present disclosure as well.

Figure 4:
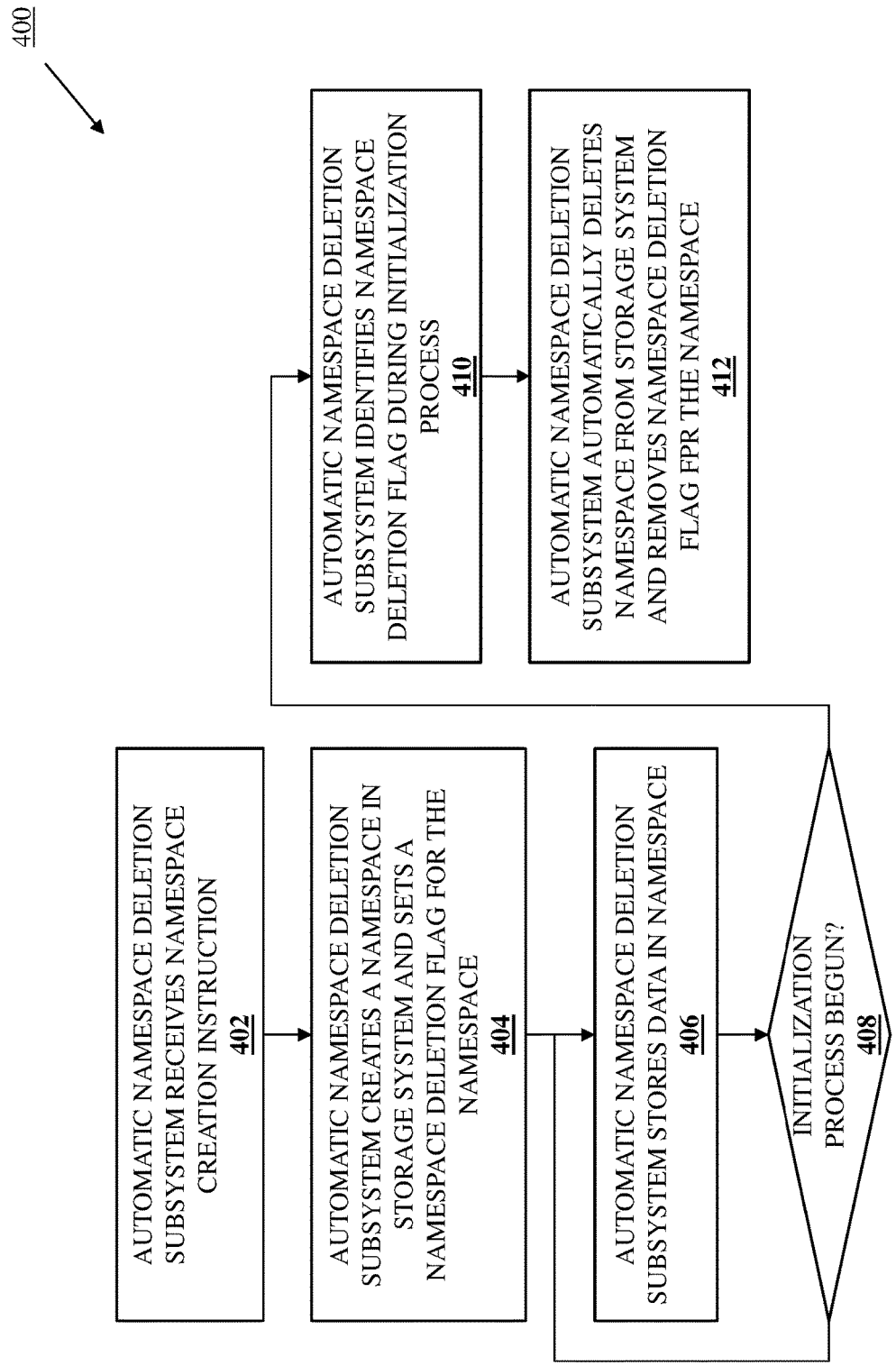
FIG. 4 is a flow chart illustrating an embodiment of a method for automatically deleting a namespace.

Referring now to FIG. 4, an embodiment of a method 400 for automatically deleting a namespace is illustrated. As discussed below, the systems and methods of the present disclosure provide a "one-shot" namespace that may be used to store data for utilization (e.g., for the AI/ML model training described below) and that is automatically deleted following that utilization. For example, the automatic namespace deletion system includes an automatic namespace deletion subsystem that is coupled to a storage system. The automatic namespace deletion subsystem receives a namespace creation instruction and, in response, creates a namespace in the storage system and sets a namespace deletion flag for the namespace. The automatic namespace deletion subsystem then stores data in the namespace in the storage system. Subsequent to storing the data in the namespace of the storage system, the automatic namespace deletion subsystem performs an initialization process and, during the initialization process, identifies the namespace deletion flag and, in response, deletes the namespace from the storage system. As such, relatively high-security data may be stored, utilized, and then subsequently erased following that utilization in a manner that prevents any subsequent access to that data.

Figure 5A:
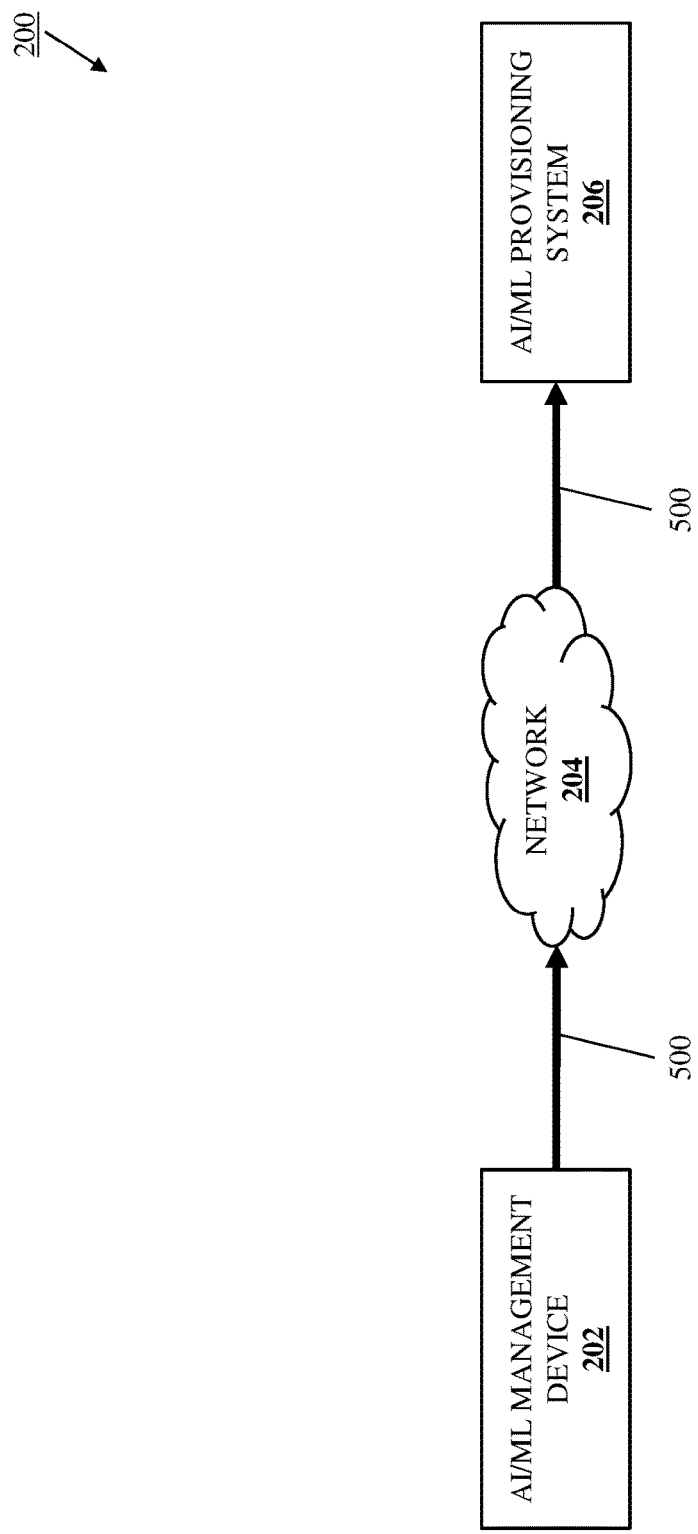
FIG. 5A is a schematic view illustrating an embodiment of the networked system of FIG. 2 operating during the method of FIG. 4.
Figure 5B:
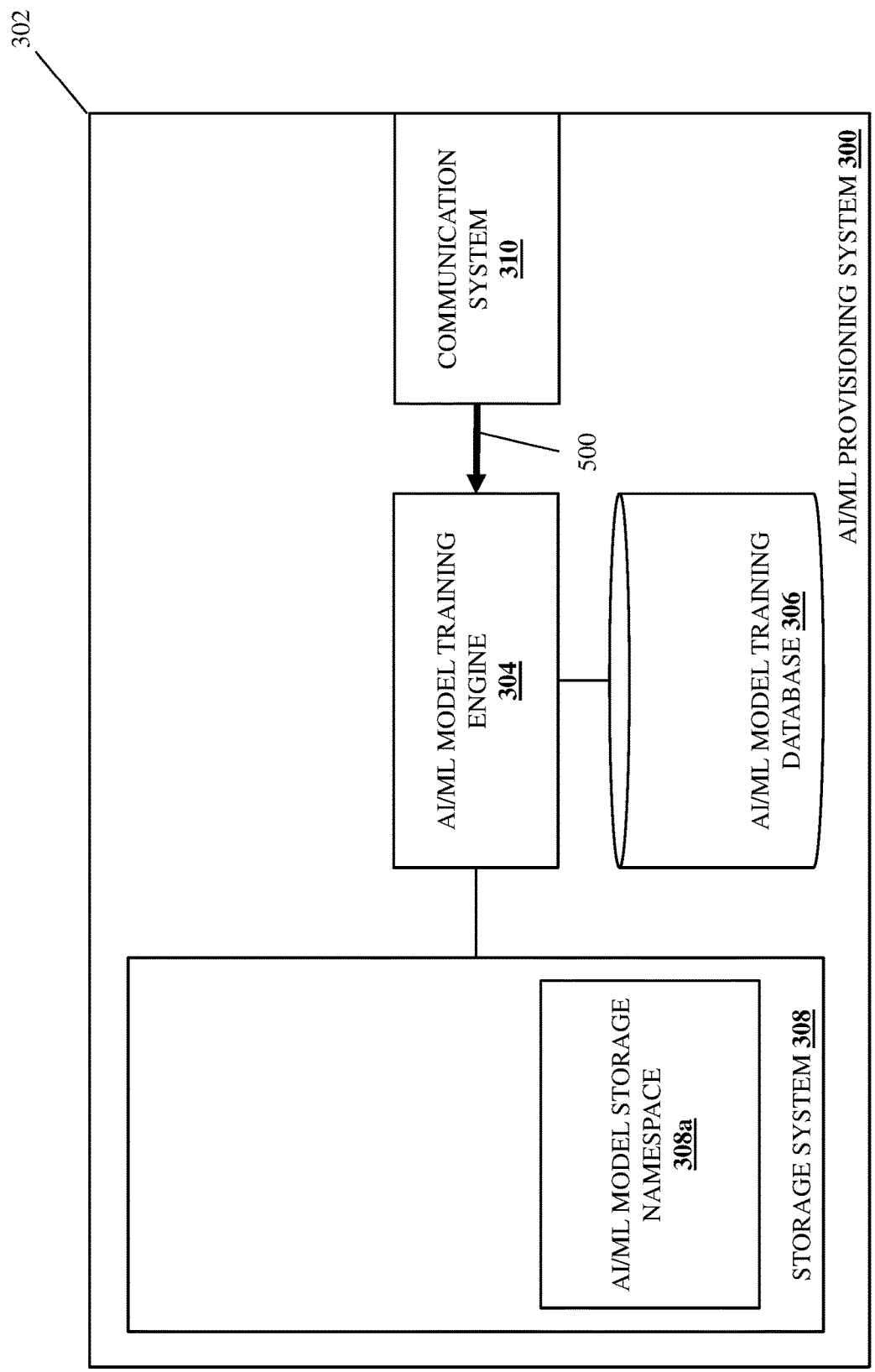
FIG. 5B is a schematic view illustrating an embodiment of the AI/ML provisioning system of FIG. 3 operating during the method of FIG. 4.

The method 400 begins at block 402 where an automatic namespace deletion subsystem receives a namespace creation instruction. With reference to FIGS. 5A and 5B, in an embodiment of block 402, the AI/ML management device 202 may perform namespace creation instruction transmission operations 500 that may include generating and transmitting a namespace creation instruction and transmitting it via the network 204 and to the AI/ML provisioning system 206/300 such that it is received by the AI/ML model training engine 304 via its communication system 310. For example, the AI/ML model training engine 304 may provide an AI/ML provisioning user interface for display on the AI/ML management device 202 via the network 204, with that AI/ML provisioning user interface allowing a user of the AI/ML management device 202 to configure any of a variety of details about the training of an AI/ML model.

In one specific example, the AI/ML provisioning user interface may be provided by a BIOS as part of a BIOS setup menu option that may be accessed during an initialization process for the AI/ML provisioning system 206/300 (e.g., a server device that provides the AI/ML provisioning system 206/300, a virtual device that provides the AI/ML provisioning system 206/300, etc.). In another specific example, the AI/ML provisioning user interface may be provided by a BMC as part of a BMC Graphical User Interface (GUI) (e.g., during runtime of a server device that provides the AI/ML provisioning system 206/300, a virtual device that provides the AI/ML provisioning system 206/300, etc.). However, while a few specific examples have been provided, one of skill in the art in possession of the present disclosure will appreciate how the AI/ML provisioning user interface may be provided in a variety of manners (e.g., by an operating system or other application) that will fall within the scope of the present disclosure as well.

As such, at block 402, the user of the AI/ML management device 202 may use the AI/ML provisioning user interface to configure AI/ML model training details, and then may "submit" or otherwise provide those AI/ML model training details via the AI/ML provisioning user interface to cause the namespace creation instruction to be generated and transmitted at block 402. In some embodiments, the namespace creation instruction may include a Namespace IDentifier (NID) (e.g., a 64-byte NID), a namespace size, and/or any other namespace details that one of skill in the art in possession of the present disclosure would recognize as allowing the functionality described below. For example, the AI/ML provisioning user interface discussed above may allow a user of the AI/ML management device 202 to define a maximum namespace size that will be required for the AI/ML model training described below, and may operate to generate the NID for that namespace that one of skill in the art in possession of the present disclosure will recognize provides a globally unique identifier for that namespace, and then may provide that namespace size and NID in the namespace creation instruction. However, while a specific example of a namespace creation instruction has been described, one of skill in the art in possession of the present disclosure will appreciate how the namespace creation instruction may be generated in a variety of manners (e.g., with the namespace size generated dynamically rather than being defined by a user) while remaining within the scope of the present disclosure as well.

Figure 6:
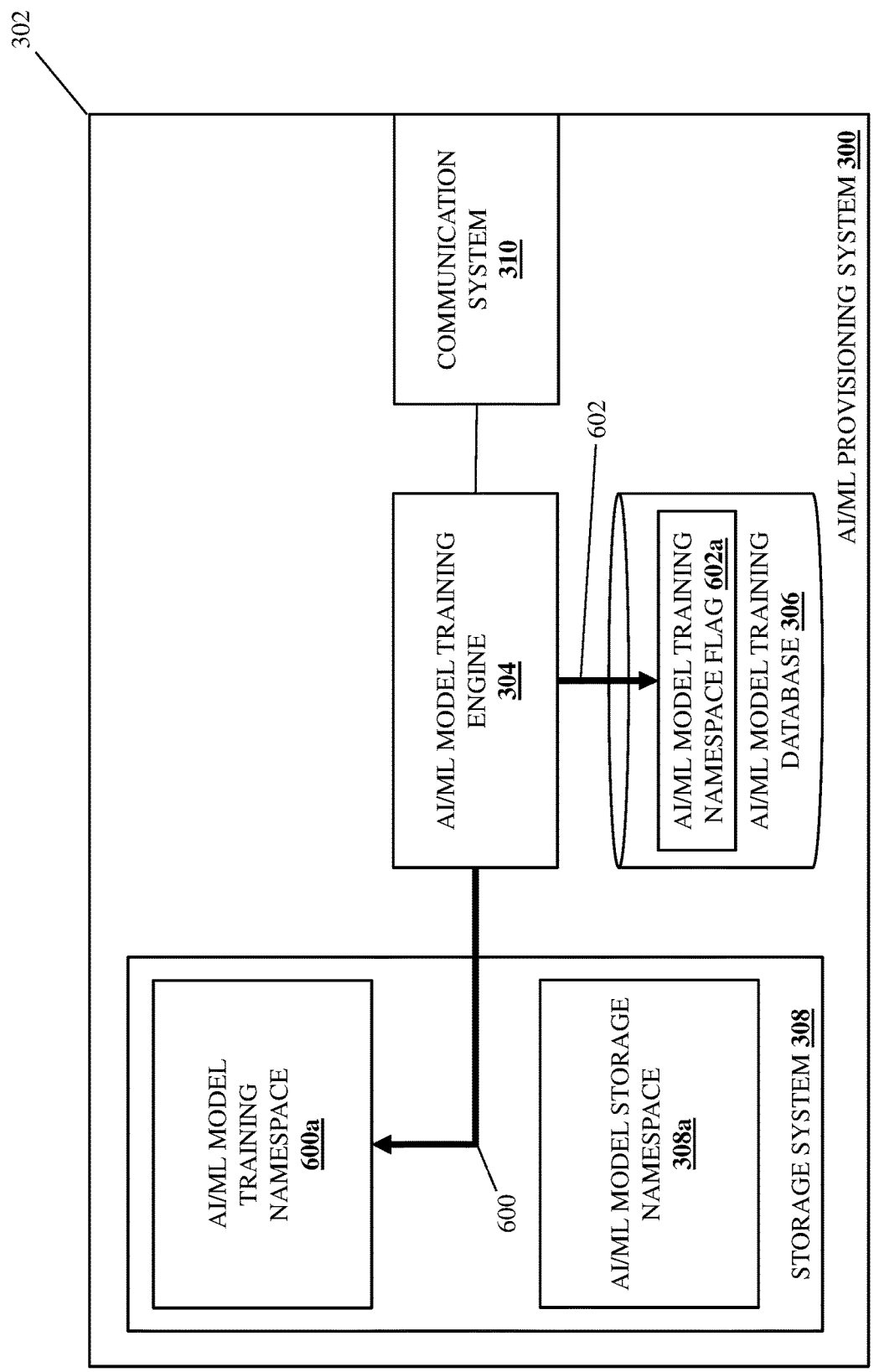
FIG. 6 is a schematic view illustrating an embodiment of the AI/ML provisioning system of FIG. 3 operating during the method of FIG. 4.

The method 400 then proceeds to block 404 where the automatic namespace deletion subsystem creates a namespace in a storage system and sets a namespace deletion flag for the namespace. With reference to FIG. 6, in an embodiment of block 404 and in response to receiving the namespace creation instruction, the AI/ML model training engine 304 in the AI/ML provisioning system 206/300 may perform namespace creation operations 600 that include creating an AI/ML model training namespace 600 in the storage system 308, and may perform namespace flag setting operations 602 that include setting an AI/ML model training namespace flag 602a in the AI/ML model training database 306. As will be appreciated by one of skill in the art in possession of the present disclosure, the namespace created at block 404 may provide a logical partition or (or subset of storage devices in) the storage system 308 that may be isolated from other namespaces in the storage system 308 and configured to restrict access to only the AI/ML management device 202. Furthermore, as described below, the AI/ML model training namespace flag 602a may provide an automatic namespace deletion flag that is configured to cause the deletion of the AI/ML model training namespace 600a during a subsequent initialization process for the AI/ML provisioning system 206/300.

Continuing with the specific example in which the namespace creation instruction is provided at block 402 via the AI/ML provisioning user interface discussed above that is provided by a BIOS as part of a BIOS setup menu option that may be accessed during an initialization process for the AI/ML provisioning system 206/300, that initialization process may continue at block 404 such that the BIOS creates the AI/ML model training namespace 600a (e.g., having the namespace size and NID as defined in the namespace creation instruction) using an NVMe "nvme-create-ns" command and/or other namespace creation commands that would be apparent to one of skill in the art in possession of the present disclosure.

Similarly, in the specific example in which the namespace creation instruction is provided at block 402 via the AI/ML provisioning user interface discussed above that is provided by a BMC as part of a BMC GUI during runtime of the AI/ML provisioning system 206/300, that BMC GUI may allow for the selection of a namespace creation boot option flag (e.g., via a script) that subsequently causes the AI/ML provisioning system 206/300 to reset, reboot, and/or otherwise initialize such that the BIOS creates the AI/ML model training namespace 600a (e.g., having the namespace size and NID as defined in the namespace creation instruction) using an NVMe "nvme-create-ns" command and/or other namespace creation commands that would be apparent to one of skill in the art in possession of the present disclosure at block 404. However, while two specific examples are provided that describe the AI/ML model training namespace 600a being created by the BIOS during initialization of the AI/ML provisioning system 206/300, one of skill in the art in possession of the present disclosure will appreciate how the AI/ML model training namespace 600a may be created during runtime of the AI/ML provisioning system 206/300 while remaining within the scope of the present disclosure as well.

Figure 7B:
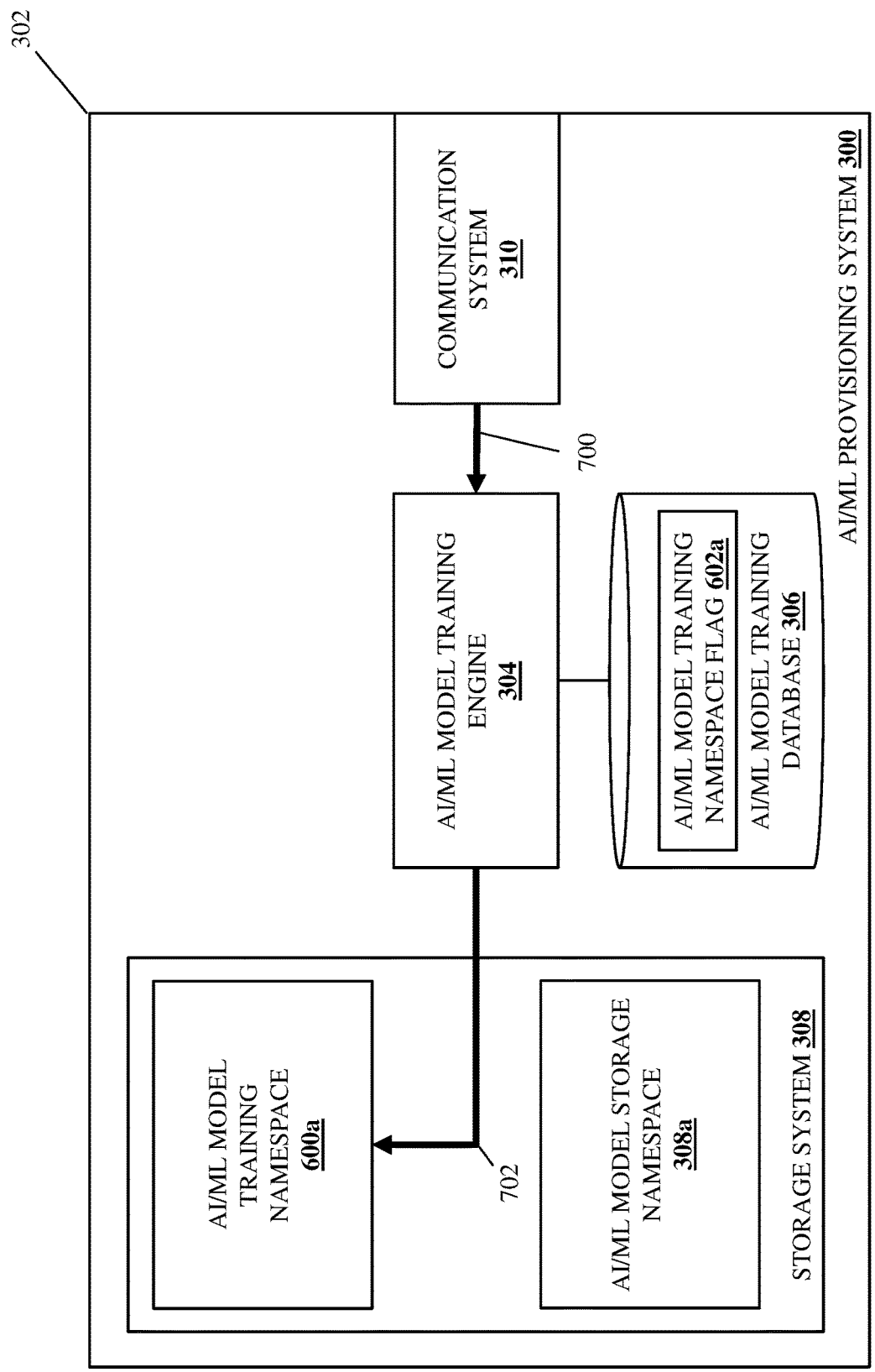
FIG. 7B is a schematic view illustrating an embodiment of the AI/ML provisioning system of FIG. 3 operating during the method of FIG. 4.

The method 400 then proceeds to block 406 where the automatic namespace deletion subsystem stores data in the namespace. With reference to FIGS. 7A and 7B, in an embodiment of block 406, the AI/ML management device 202 may perform data transmission operations 700 that may include transmitting AI/ML model training data via the network 204 and to the AI/ML provisioning system 206/300 such that it is received by the AI/ML model training engine 304 via its communication system 310. Continuing with the examples above in which the BIOS created the AI/ML model training namespace 600a during an initialization process for the AI/ML provisioning system 206/300, that initialization process may complete such that an operating system takes control of the AI/ML provisioning system 206/300 and the AI/ML model training namespace 600a is visible, accessible, and/or otherwise available to store data, and the user of the AI/ML management device 202 may transmit the AI/ML model training data (i.e., the relatively high-security, proprietary, sensitive data described above) from any of a variety of AI/ML model training data secure sources/locations/databases that would be apparent to one of skill in the art in possession of the present disclosure. With continued reference to FIG. 7B, the AI/ML model training engine 304 may then perform data storage operations 702 that may include storing the AI/ML model training data received from the AI/ML management device 202 in the AI/ML model training namespace 600a in the storage system 308.

Figure 8A:
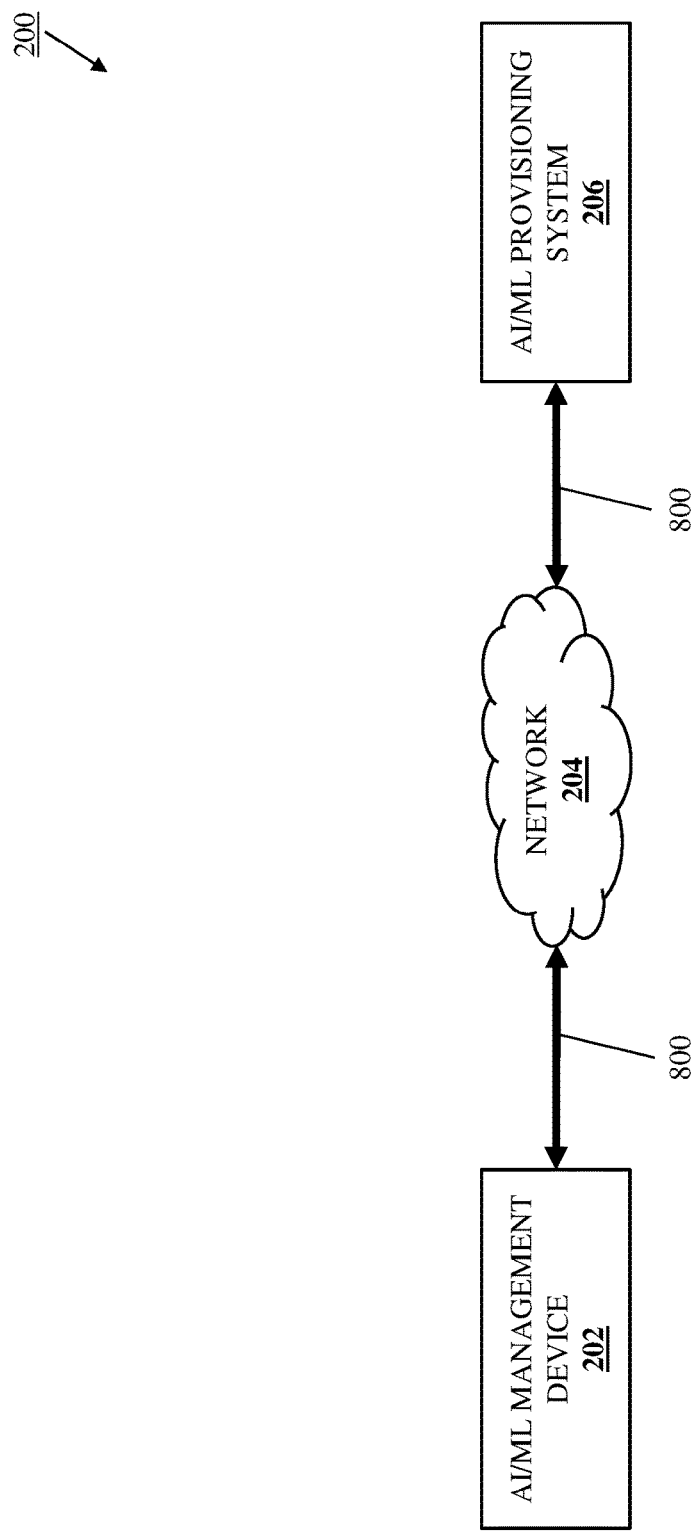
FIG. 8A is a schematic view illustrating an embodiment of the networked system of FIG. 2 operating during the method of FIG. 4.

With reference to FIGS. 8A and 8B, in some embodiments, the AI/ML model training engine 304 in the AI/ML provisioning system 206/300 (e.g., CPUs, GPUs, corresponding memory, etc.) may perform AI/ML model training operations 800 with the AI/ML management device 202 via the network 204 and its communication system 310 that include using the AI/ML model training data stored in the AI/ML model training namespace 600a in order to perform any of a variety of AI/ML model training operations that one of skill in the art in possession of the present disclosure would recognize as providing for the training of an AI/ML model.

The method 400 then proceeds to decision block 408 where the method 400 proceeds depending on whether an initialization process has begun. As will be appreciated by one of skill in the art in possession of the present disclosure, the AI/ML model training operations 800 may be performed using the using the AI/ML model training data stored in the AI/ML model training namespace 600a until the resulting AI/ML model performs to satisfactory accuracy and/or otherwise results in desired AI/ML model functionality, after which the AI/ML provisioning system 206/300 may be reset, rebooted, and/or otherwise may begin an initialization process. As such, if at decision block 408 the AI/ML model training operations 800 are being performed using the AI/ML model training data stored in the AI/ML model training namespace 600a such that an initialization process has not yet begun for the AI/ML provisioning system 206/300, the method 400 returns to block 406. Thus, the method 400 may loop such that the data (e.g., the AI/ML model training data) remains stored in the AI/ML model training namespace 600a until AI/ML model training is completed and an initialization process begins for the AI/ML provisioning system 206/300.

Figure 9:
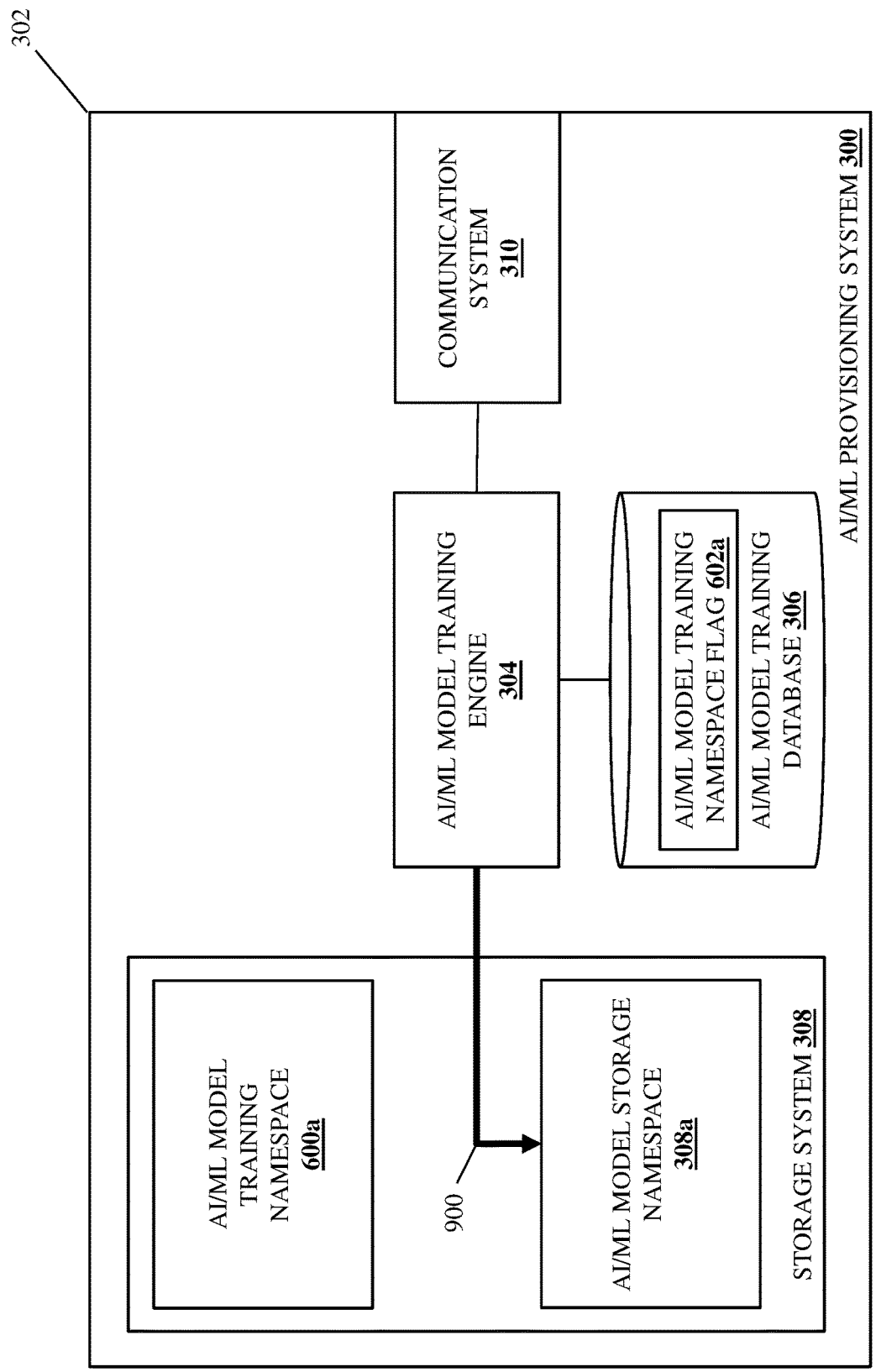
FIG. 9 is a schematic view illustrating an embodiment of the AI/ML provisioning system of FIG. 3 operating during the method of FIG. 4.
Figure 10:
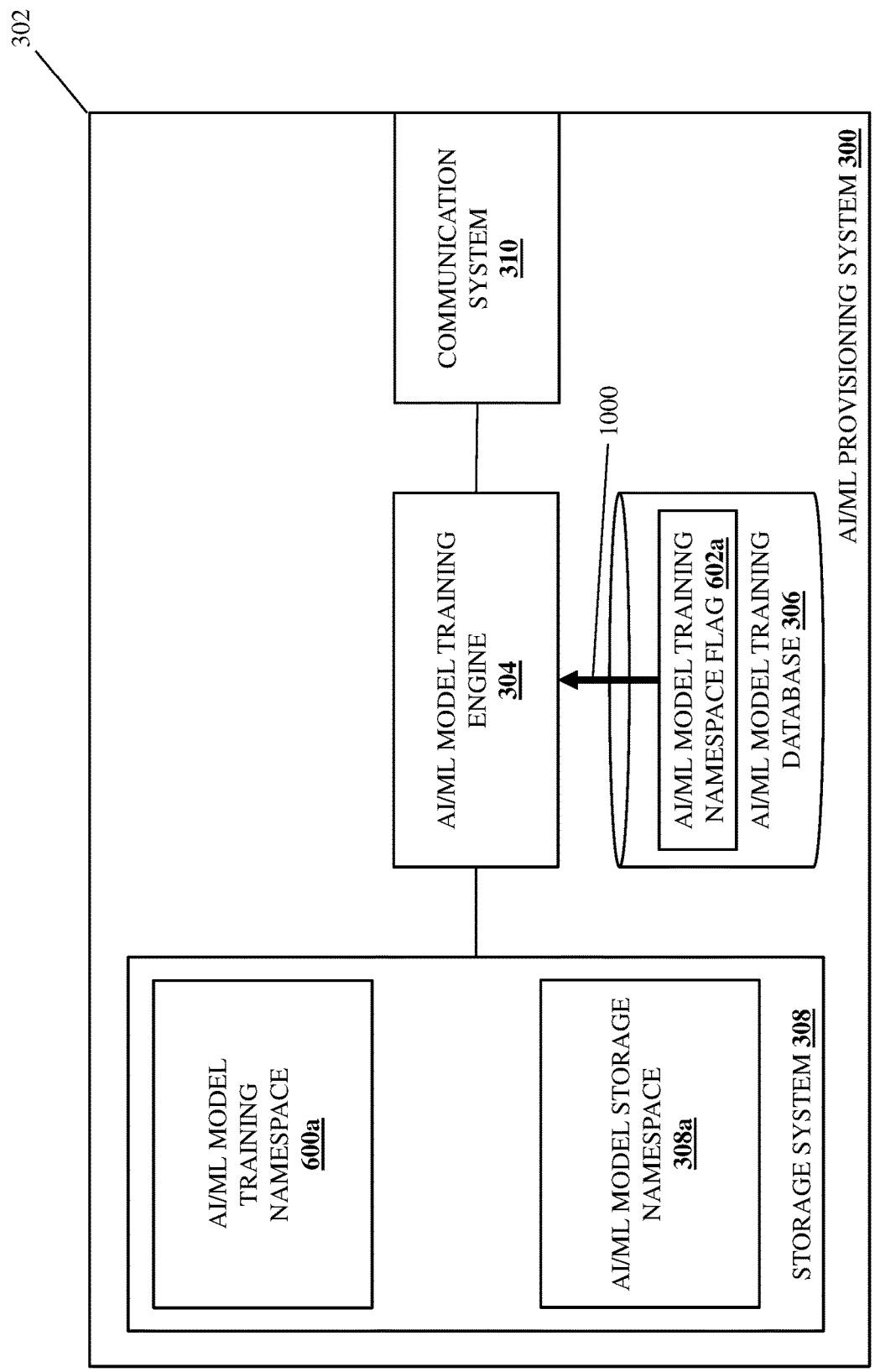
FIG. 10 is a schematic view illustrating an embodiment of the AI/ML provisioning system of FIG. 3 operating during the method of FIG. 4.

If, at decision block 408, an initialization process has begun, the method 400 proceeds to block 410 where the automatic namespace deletion subsystem identifies the namespace deletion flag during the initialization process. With reference to FIG. 9, following the AI/ML model training operations 800 such that the AI/ML model performs to satisfactory accuracy and/or otherwise results in desired AI/ML model functionality, the AI/ML model training engine 304 may perform AI/ML model storage operations 900 that include storing the AI/ML model that was created via the AI/ML model training operations 800 in the AI/ML model storage namespace 308a in the storage system 308 (e.g., in a trained AI/ML model format such as a PYTHON PICKLE format binary image). However, while described as being stored in the AI/ML provisioning system 206/300, one of skill in the art in possession of the present disclosure will appreciate how the AI/ML model training engine 304 may transmit the AI/ML model that was created via the AI/ML model training operations 800 via its communication system 310 and through the network 204 to the AI/ML management device 202 while remaining within the scope of the present disclosure as well.

Subsequent to the completion of the AI/ML model training operations 800 and the storage of the resulting AI/ML model, the AI/ML provisioning system 206/300 may be reset, rebooted, and/or otherwise may begin an initialization process. In some embodiments, the resetting, rebooting, and/or other beginning of the initialization process for the AI/ML provisioning system 206/300 may be instructed by the AI/ML management device 202 (e.g., automatically, by the user, etc.) However, in other embodiments, the resetting, rebooting, and/or other beginning of the initialization process for the AI/ML provisioning system 206/300 may be instructed by the AI/ML provisioning system 206/300. To provide a specific example, the AI/ML provisioning system 206/300 may be configured to reset, reboot, and/or otherwise begin an initialization process whenever the storage system 308 is being allocated to a "new" user (i.e., as compared to the "previous" user of the AI/ML management device 202 that performed the AI/ML model training during the method 400 as described above), and thus the initialization process for the AI/ML provisioning system 206/300 at decision block 408 may begin subsequent to the completion of the AI/ML model training operations 800 described above and prior to another user being allowed access to the AI/ML provisioning system 206/300. However, while several specific examples have been provided, one of skill in the art in possession of the present disclosure will appreciate how the initialization process that provides for the automatic namespace deletion described below may be performed in a variety of manners that will fall within the scope of the present disclosure as well.

In an embodiment, at block 410 and during the initialization process for the AI/ML provisioning system 206/300, the AI/ML model training engine 304 (e.g., a BIOS) in the AI/ML provisioning system 206/300 may perform AI/ML model training namespace flag identification operations 1000 that include identifying that the AI/ML model training namespace flag 602a is set in the AI/ML model training database 306.

Figure 11A:
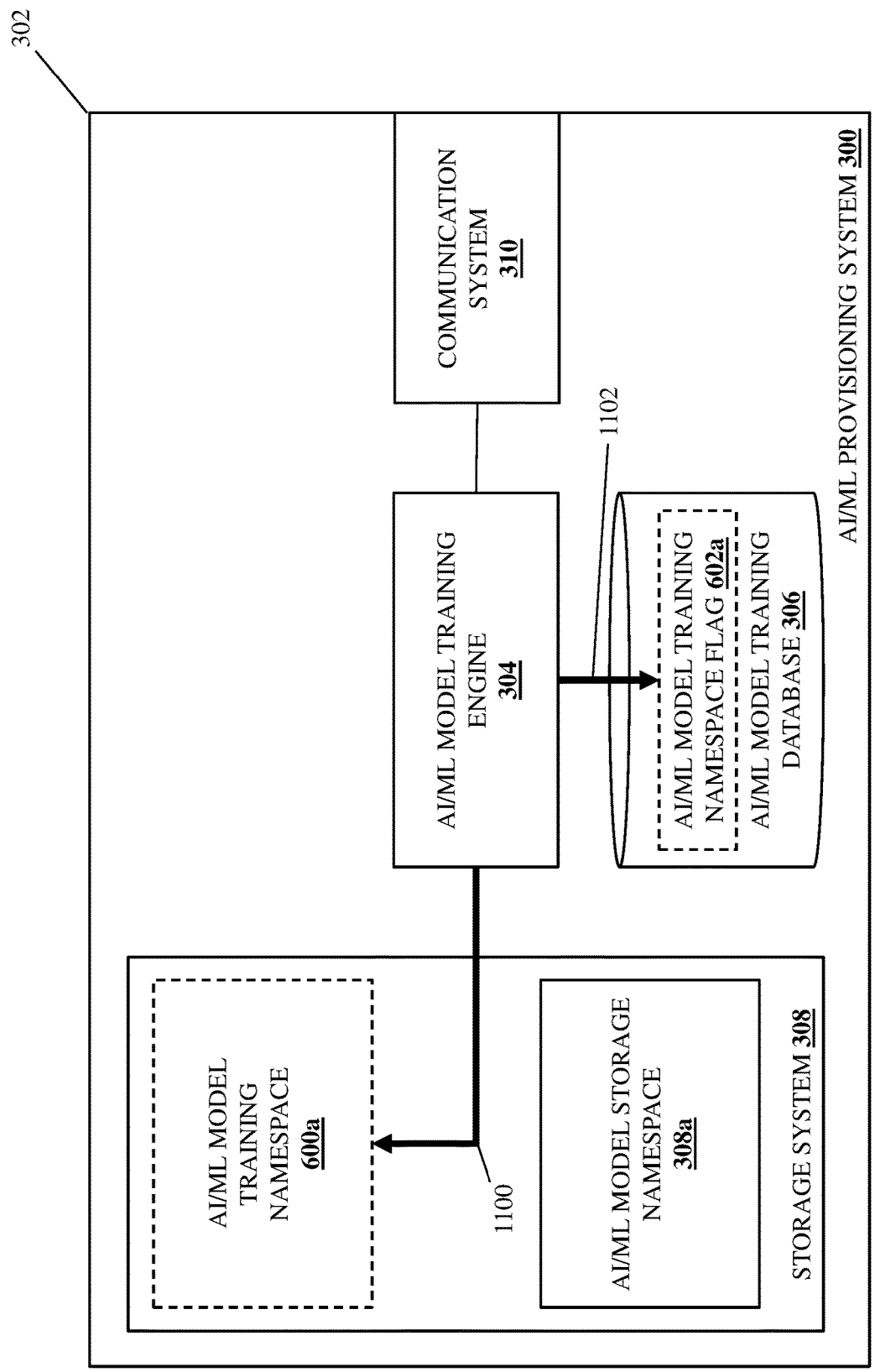
FIG. 11A is a schematic view illustrating an embodiment of the AI/ML provisioning system of FIG. 3 operating during the method of FIG. 4.
Figure 11B:
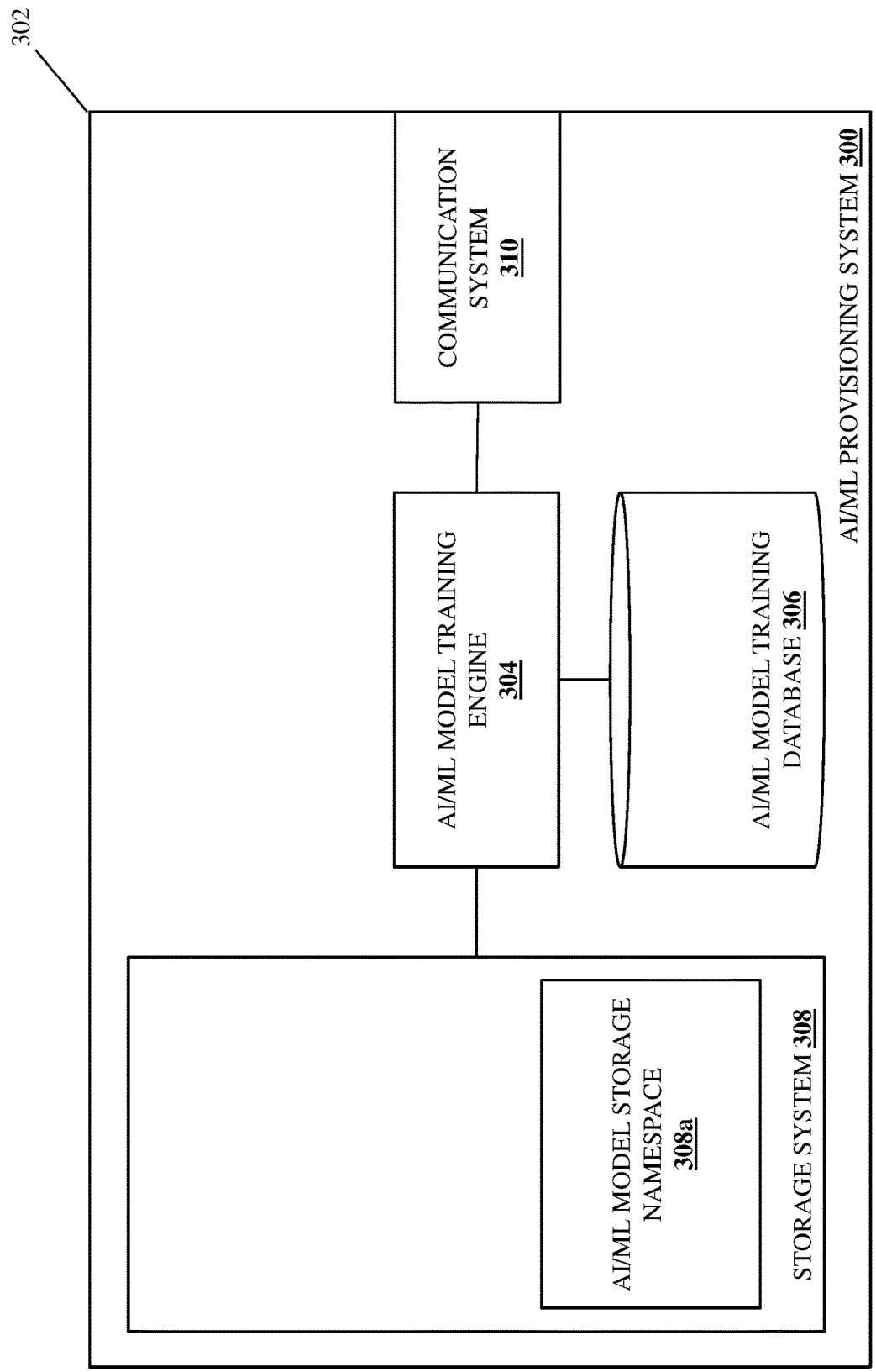
FIG. 11B is a schematic view illustrating an embodiment of the AI/ML provisioning system of FIG. 3 operating during the method of FIG. 4.

The method 400 then proceeds to block 412 where the automatic namespace deletion subsystem automatically deletes the namespace from the storage system and removes the namespace deletion flag for the namespace. With reference to FIGS. 11A and 11B, in an embodiment of block 412 and in response to identifying that the AI/ML model training namespace flag 602a is set in the AI/ML model training database 306, the AI/ML model training engine 304 (e.g., a BIOS) in the AI/ML provisioning system 206/300 may perform namespace deletion operations 1100 that include automatically deleting the AI/ML model training namespace 600a from the storage system 308 (e.g., in response to identifying that the AI/ML model training namespace flag 602a is set and without any instruction from a user), and may perform namespace deletion flag removal operations 1102 that include removing the AI/ML model training namespace flag 602a from the AI/ML model training database 306. To provide a specific example, the namespace deletion operations 1100 may include performing one or more sanitize cryptographic erase operations in order to securely delete the AI/ML model training namespace 600a from the storage system 308, which one of skill in the art in possession of the present disclosure will appreciate operates to securely delete the AI/ML model training data that was stored therein and that was used to create the AI/ML model as described above. As such, following block 412, the AI/ML model training data that was stored in the AI/ML provisioning system 206/300 and used to create the AI/ML model as described above is no longer accessible or available to any subsequent user of the AI/ML provisioning system 206/300.

Figure 12A:
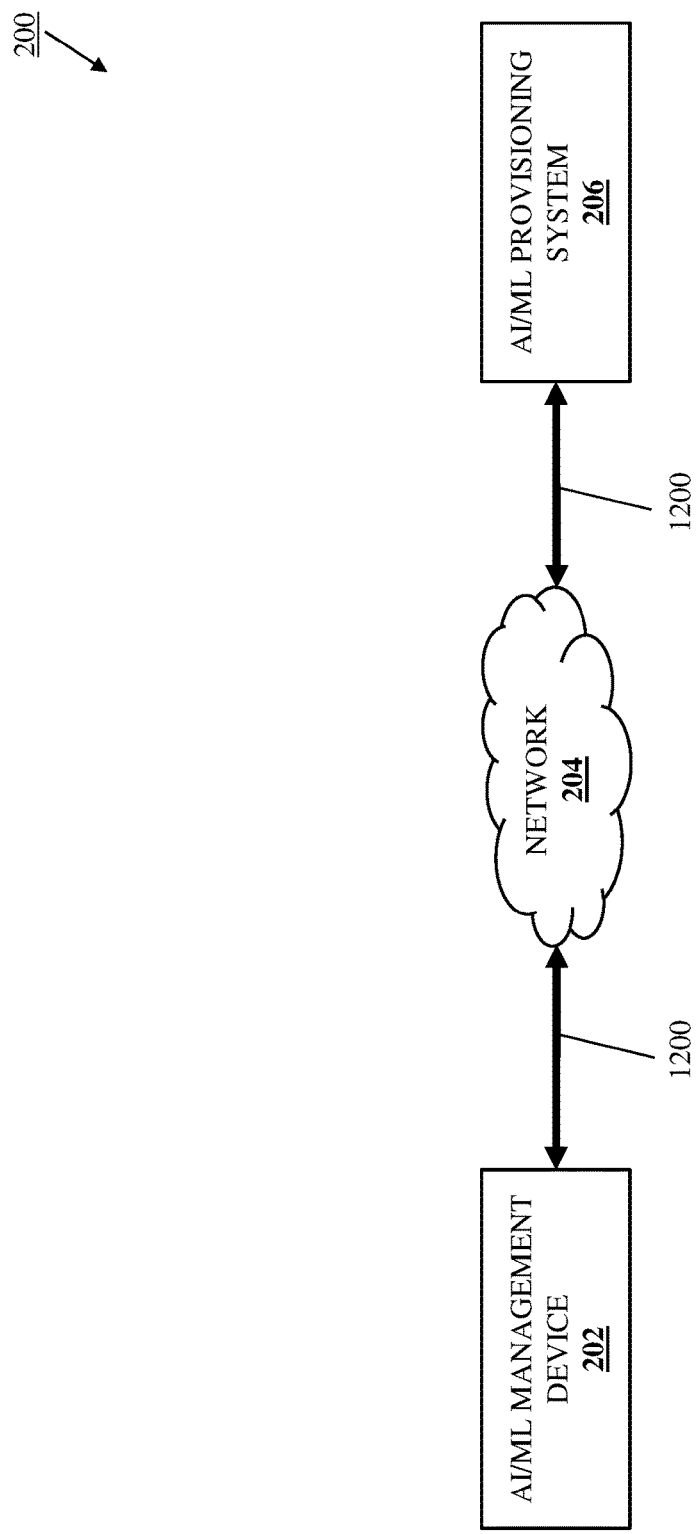
FIG. 12A is a schematic view illustrating an embodiment of the networked system of FIG. 2 operating during the method of FIG. 4.
Figure 12B:
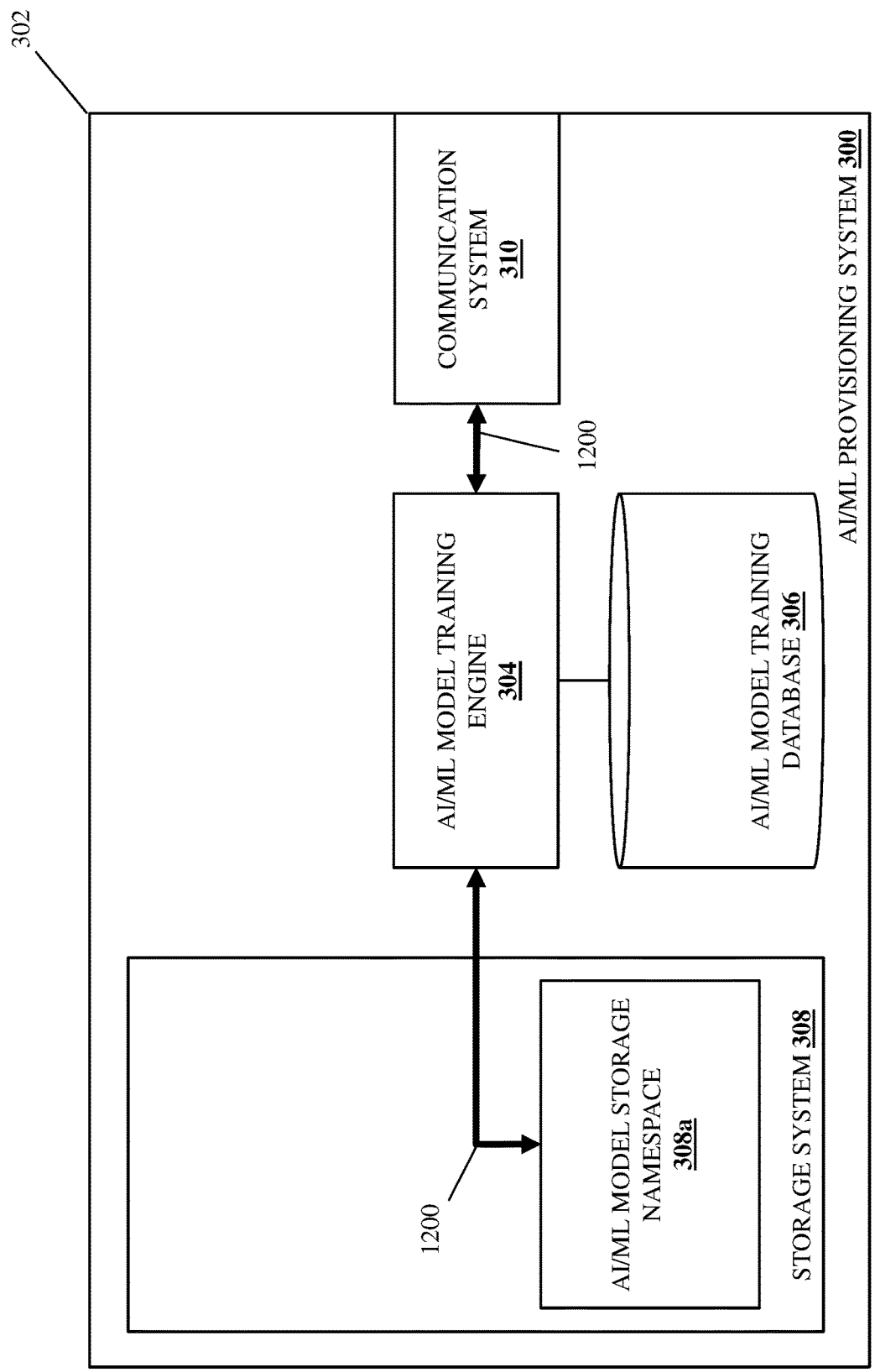
FIG. 12B is a schematic view illustrating an embodiment of the AI/ML provisioning system of FIG. 3 operating during the method of FIG. 4.

With reference to FIGS. 12A and 12B, in embodiments in which the AI/ML model is stored in the AI/ML provisioning system 206/300, the AI/ML model training engine 304 in the AI/ML provisioning system 206/300 (e.g., CPUs, GPUs, corresponding memory, etc.) may perform AI/ML model use operations 1200 with the AI/ML management device 202 via the network 204 and its communication system 310 that include using the AI/ML model stored in the AI/ML model storage namespace 308a in order to perform any of a variety of AI/ML model use operations (e.g., live AI/ML model inference operations) that one of skill in the art in possession of the present disclosure would recognize as available via a trained AI/ML model.

While the embodiments described above only discuss securing AI/ML model training data via the storage of that AI/ML model training data in the AI/ML model training namespace 600a of the present disclosure, one of skill in the art in possession of the present disclosure will appreciate how even higher levels of security for AI/ML model training data and any associated data may be provided via the teachings of the present disclosure as well. For example, one of skill in the art in possession of the present disclosure will appreciate how an operating system in the AI/ML provisioning system 206/300 that is used to perform the AI/ML model training described above may, as a result of that AI/ML model training, store or otherwise persist metadata and/or other intermediate data related to the AI/ML model training. As such, that operating system may be provided via the AI/ML model training namespace 600a of the present disclosure (e.g., via the storage of an operating system image or other data stored in the AI/ML model training namespace 600a along with the AI/ML model training data discussed above) such that, once the AI/ML model training operations have been completed, that operating system is deleted along with the AI/ML model training data as described above, thus deleting any metadata and/or intermediate data associated with that AI/ML model training as well.

Thus, systems and methods have been described that provide a "one-shot" namespace that may be used to store data for utilization (e.g., for the AI/ML model training described below) and that is automatically deleted following that utilization. For example, the automatic namespace deletion system includes an automatic namespace deletion subsystem that is coupled to a storage system. The automatic namespace deletion subsystem receives a namespace creation instruction and, in response, creates a namespace in the storage system and sets a namespace deletion flag for the namespace. The automatic namespace deletion subsystem then stores data in the namespace in the storage system. Subsequent to storing the data in the namespace of the storage system, the automatic namespace deletion subsystem performs an initialization process and, during the initialization process, identifies the namespace deletion flag and, in response, deletes the namespace from the storage system. As such, relatively high-security data may be stored and utilized in persistent storage that is configured to operate like volatile storage by providing for the erasure of that relatively high-security data when the system is reset, rebooted, and/or otherwise initialized.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An automatic namespace deletion system, comprising:
   a storage system; and
   an automatic namespace deletion subsystem that is coupled to the storage system and that is configured to:
   receive a namespace creation instruction;
   create, in response to receiving the namespace creation instruction, a namespace in the storage system;
   set a namespace deletion flag for the namespace;
   store data in the namespace in the storage system;

perform, subsequent to storing the data in the namespace of the storage system, an initialization process that is the first initialization process performed subsequent to storing the data in the namespace in the storage system;
identify, during the initialization process, that the namespace deletion flag is set; and
delete, in response to identifying the namespace deletion flag is set during the initialization process, the namespace from the storage system.

2. The system of claim 1, wherein the data stored in the namespace in the storage system is Artificial Intelligence/Machine Learning (AI/ML) model training data and the automatic namespace deletion subsystem is included in an AI/ML model training subsystem that is configured to:
perform, using the AI/ML model training data stored in the namespace in the storage system, at least one AI/ML model training operation.

3. The system of claim 2, wherein the AI/ML model training subsystem is configured to:
provide an AI/ML model trained using the AI/ML model training data and via the at least one AI/ML model training operation for storage outside the namespace.

4. The system of claim 1, wherein the automatic namespace deletion subsystem includes a Basic Input/Output System (BIOS) that is configured to perform the initialization process, identify that the namespace deletion flag is set, and delete the namespace from the storage system.

5. The system of claim 1, wherein the deleting the namespace from the storage system includes performing at least one sanitize cryptographic erase operation.

6. The system of claim 1, wherein the storage system includes at least one Non-Volatile Memory express (NVMe) storage device, and wherein the namespace is an NVMe namespace.

7. An Information Handling System (IHS), comprising:
a processing system; and
a memory system that is coupled to the processing system and that includes instructions that, when executed by the processing system, cause the processing system to provide an automatic namespace deletion engine that is configured to:
receive a namespace creation instruction;
create, in response to receiving the namespace creation instruction, a namespace in a storage system that is coupled to the processing system;
set a namespace deletion flag for the namespace;
store data in the namespace in the storage system;
perform, subsequent to storing the data in the namespace of the storage system, an initialization process that is the first initialization process performed subsequent to storing the data in the namespace in the storage system;
identify, during the initialization process, that the namespace deletion flag is set; and
delete, in response to identifying the namespace deletion flag is set during the initialization process, the namespace from the storage system.

8. The IHS of claim 7, wherein the data stored in the namespace in the storage system is Artificial Intelligence/Machine Learning (AI/ML) model training data and the memory system includes instructions that, when executed by the processing system, cause the processing system to provide an AI/ML model training engine that includes the automatic namespace deletion engine and that is configured to:
perform, using the AI/ML model training data stored in the namespace in the storage system, at least one AI/ML model training operation.

9. The IHS of claim 8, wherein the AI/ML model training subsystem is configured to:
provide an AI/ML model trained using the AI/ML model training data and via the at least one AI/ML model training operation for storage outside the namespace.

10. The IHS of claim 7, wherein the automatic namespace deletion engine includes a Basic Input/Output System (BIOS) that is configured to perform the initialization process, identify that the namespace deletion flag is set, and delete the namespace from the storage system.

11. The IHS of claim 10, wherein the BIOS is configured to create the namespace.

12. The IHS of claim 7, wherein the deleting the namespace from the storage system includes performing at least one sanitize cryptographic erase operation.

13. The IHS of claim 7, wherein the storage system includes at least one Non-Volatile Memory express (NVMe) storage device, and wherein the namespace is an NVMe namespace.

14. A method for automatically deleting a namespace, comprising:
receiving, by an automatic namespace deletion subsystem, a namespace creation instruction;
creating, by the automatic namespace deletion subsystem in response to receiving the namespace creation instruction, a namespace in a storage system that is coupled to the automatic namespace deletion subsystem;
setting, by the automatic namespace deletion subsystem, a namespace deletion flag for the namespace;
storing, by the automatic namespace deletion subsystem, data in the namespace in the storage system;
performing, by the automatic namespace deletion subsystem subsequent to storing the data in the namespace of the storage system, an initialization process that is the first initialization process performed subsequent to storing the data in the namespace in the storage system;
identifying, by the automatic namespace deletion subsystem during the initialization process, that the namespace deletion flag is set; and
deleting, by the automatic namespace deletion subsystem in response to identifying the namespace deletion flag is set during the initialization process, the namespace from the storage system.

15. The method of claim 14, wherein the data stored in the namespace in the storage system is Artificial Intelligence/Machine Learning (AI/ML) model training data and the method further comprises:
performing, by an AI/ML model training subsystem that includes the automatic namespace deletion subsystem using the AI/ML model training data stored in the namespace in the storage system, at least one AI/ML model training operation.

16. The method of claim 15, further comprising:
providing, by the AI/ML model training subsystem, an AI/ML model trained using the AI/ML model training data and via the at least one AI/ML model training operation for storage outside the namespace.

17. The method of claim 14, wherein the automatic namespace deletion subsystem includes a Basic Input/Output System (BIOS) that performs the initialization process, identifies that the namespace deletion flag is set, and deletes the namespace from the storage system.

18. The method of claim 17, wherein the BIOS creates the namespace.

19. The method of claim 14, wherein the deleting the namespace from the storage system includes performing at least one sanitize cryptographic erase operation.

20. The method of claim 14, wherein the storage system includes at least one Non-Volatile Memory express (NVMe) storage device, and wherein the namespace is an NVMe namespace.

\* \* \* \* \*